United States Patent
Russell et al.

[11] Patent Number: 5,121,930
[45] Date of Patent: Jun. 16, 1992

[54] PISTON SEAL CARTRIDGE FOR A RECIPROCATING NEEDLE

[75] Inventors: Gary A. Russell, Pacific Grove; Paul J. Donley, Monterey, both of Calif.

[73] Assignee: Graco Inc., Minneapolis, Minn.

[21] Appl. No.: 525,118

[22] Filed: May 17, 1990

[51] Int. Cl.[5] .......................... F16J 15/56; F16J 15/18
[52] U.S. Cl. ................................ 277/37; 92/165 R;
92/169.1; 222/146.2; 277/35; 277/50; 277/58;
277/188 A; 277/206 A; 285/404
[58] Field of Search ............... 277/35, 37, 50, 188 R,
277/188 A, 58, 59, 63, 4, 66, 206 A; 285/404;
92/165 R, 168, 169.1; 272/146.2, 146.5;
251/214

[56] References Cited

U.S. PATENT DOCUMENTS

| | | | |
|---|---|---|---|
| 2,279,167 | 4/1942 | Jackson | 277/63 |
| 2,666,658 | 1/1954 | Laucks | 92/165 R X |
| 3,007,723 | 11/1961 | Clarke | 92/168 X |
| 3,147,983 | 9/1964 | Neuman et al. | 277/50 |
| 3,288,473 | 11/1966 | Hinds | 277/58 |
| 3,303,746 | 2/1967 | Schmoeger | 92/168 X |
| 3,665,816 | 5/1972 | Caudle | 92/168 |
| 3,738,665 | 6/1973 | Bilco | 277/59 X |
| 3,817,517 | 6/1974 | Lundqvist | 277/190 X |
| 3,943,717 | 3/1976 | Schexnayder | 277/59 X |
| 4,040,636 | 8/1977 | Albertson et al. | 277/188 X |
| 4,179,131 | 12/1979 | Nussbaumer | 277/188 R X |
| 4,211,151 | 7/1980 | Wallischeck | 92/146 |
| 4,256,313 | 3/1981 | Arnold | 277/11 |
| 4,312,264 | 1/1982 | Nunnemacher et al. | 92/161 |
| 4,320,858 | 3/1982 | Mercer | 222/146.5 |
| 4,323,003 | 4/1982 | Clippard, III | 92/87 |
| 4,493,373 | 1/1985 | Jackson | 277/188 A X |
| 4,519,638 | 5/1985 | Yodoshi et al. | 285/404 X |

FOREIGN PATENT DOCUMENTS

| | | | |
|---|---|---|---|
| 134270 | 8/1983 | Japan | 92/168 |
| 2094416 | 9/1982 | United Kingdom | 277/59 |

*Primary Examiner*—Allan N. Shoap

[57] ABSTRACT

An air operated dispense head for dispensing of hot melt and related adhesives is provided which utilizes a drop-in seal cartridge assembly in which a hardened needle is sealed using a pair of quad seals along with soft back up rings. Improved life is obtained from this combination of elements.

5 Claims, 2 Drawing Sheets

PISTON SEAL CARTRIDGE FOR A RECIPROCATING NEEDLE

BACKGROUND OF THE INVENTION

Air operated dispensing heads for the dispensing of various fluids such as hot melt adhesive are, of course, well known and have been in common use for many years. Such heads must operate reliably and accurately at relatively elevated pressures (up to 1,000 PSI) and at relatively rapid activation rates (5,000 cycles per minute). Industry standard cartridges are generally pressed in or screwed into the housing. Such construction often leads to the galling and seating of the cylinder in normal long term usage as seen presently.

It is therefore an object of this invention to provide an air operated dispense head which is capable of extended life and yet which is easy to assemble and manufacture.

SUMMARY OF THE INVENTION

An air operated dispense head is provided wherein the needle is formed of a hardened stainless steel and is guided by a pair of internal quad seals one of which is backed up by soft back up rings formed of a Rulon ® material.

The cartridge is located in the dispense head housing with some diametrical clearance using external static elastomeric seals. It is further located and held in place by captive shoulder bolts which are removable by hand. This self-alignment construction allows the cartridge to be centered by or concentric with the piston as it is inserted within the cartridge thereby minimizing side loading and accordingly increasing seal life. The industry standard constructions do not allow for self alignment and therefore inevitably result in seal side loading which results in reduced seal life.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
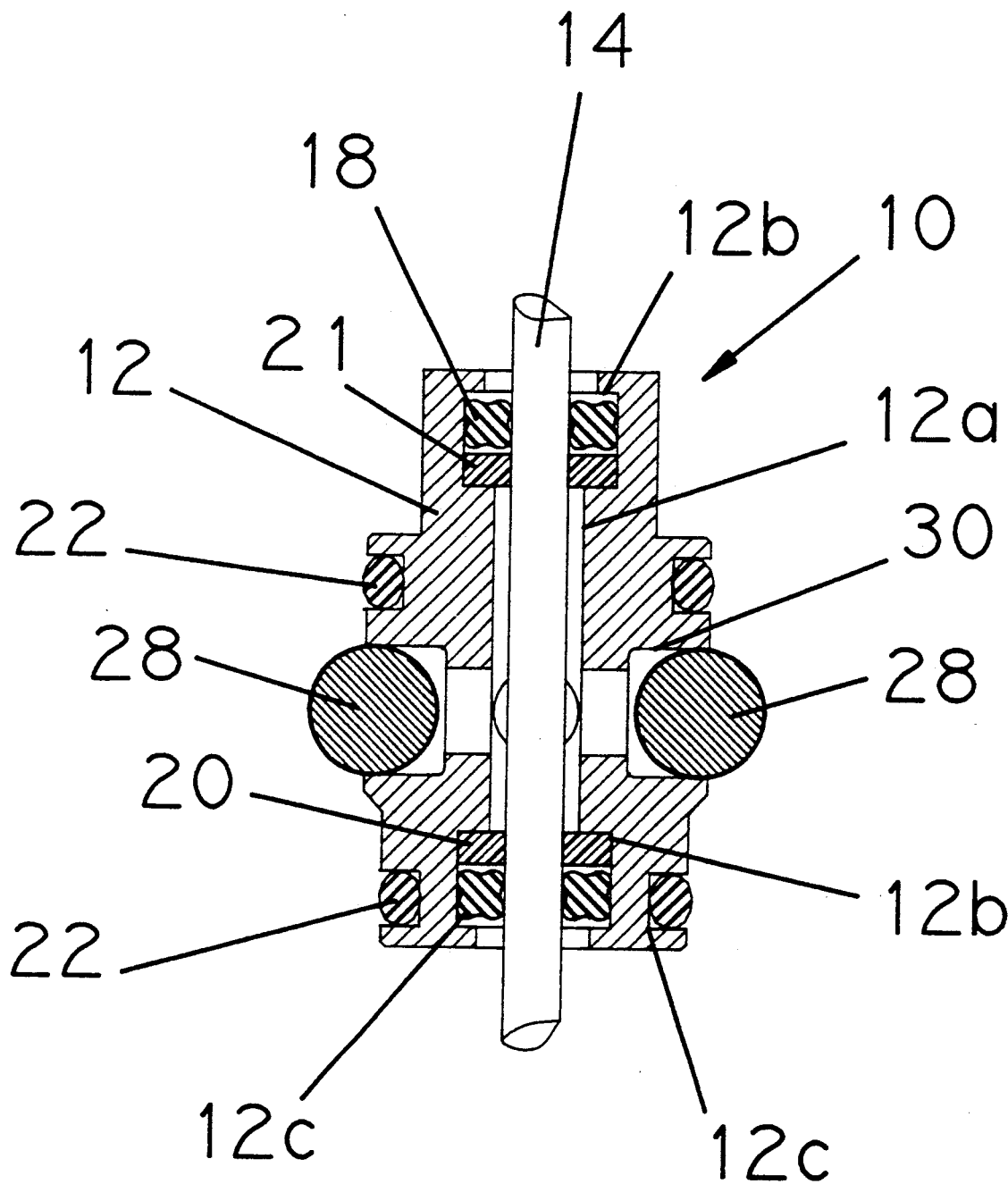
FIG. 1 is a cross sectional view of the seal cartridge of the instant invention.
Figure 2:
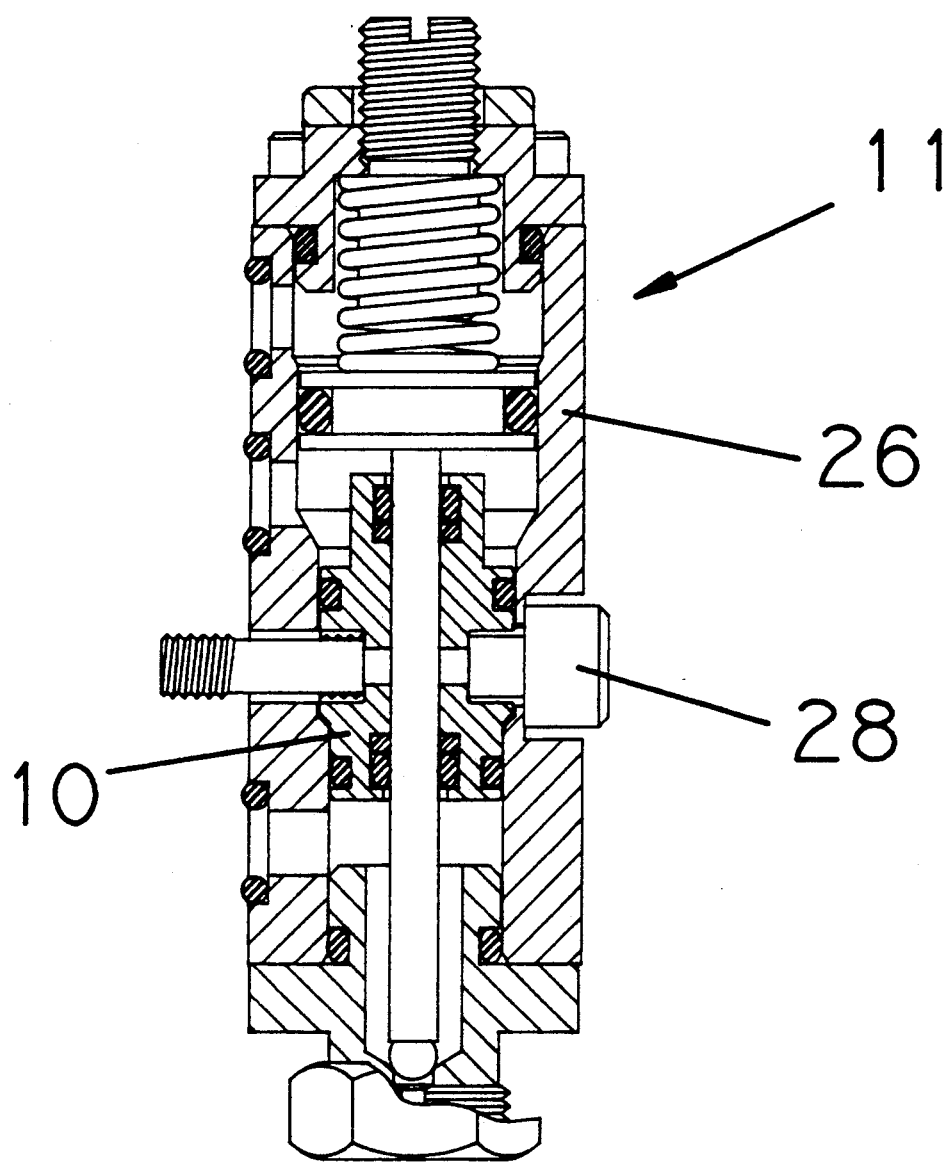
FIG. 2 is a cross sectional view of the dispense head of the instant invention.

The cartridge of the instant invention is generally designated 10 as shown in FIG. 1 and is comprised of a generally cylindrical body 12, a hardened needle piston 14, first and second quad seals 16 and 18 respectively, backup rings 20 and 21 and external seals 22. Cartridge 10 is utilized in an air operated dispense head 11 as shown more generally in FIG. 2

Body 12 is provided with an interior bore 12a which serves to accommodate the needle 14. Bore 12a has a pair of grooves 12b located therein. The groove width (that is axial length) is not particularly critical however the depth of the groove is and toward that end, a groove 12b having a diameter of 0.247 inches is the preferred embodiment in association with the various dimensions suggested hereinafter.

A pair of grooves 12c are located in the outer circumference of body 12 and serve to accommodate external static seals 22. Needle 14 is formed ideally of a 440C stainless steel which forms a very hard and long-wearing surface.

First and second quad seals 16 and 18 are so named because of their cloverleaf appearance in cross section. Such seals are desirably formed from a Viton ® v884-75 material which is a fluorinated rubber material manufactured by DuPont.

Backup rings 20 and 21 are generally annular in shape and are manufactured from Rulon ® "A" fluoropolymer, a material manufactured by Dixon Industries. Rulon ® is a fiber filled Teflon ® type material and is relatively soft (having a durometer reading of 70 on the Shore D scale) compared to normal type backup rings which are manufactured from metal or very hard rubbers. The particular combination of elements disclosed in this application has yielded substantially improved results over prior art devices. The device of the instant invention yields life before leakage of 4 to 5 times the previous best known industry standard devices.

Quad seals 16 and 18 have a free inside diameter of 0.114 inches and an outside diameter of 0.254 inches. Needle 14 has a diameter of 0.125 inches in the preferred embodiment.

The cartridge 10 is held in module 26 by means of shoulder bolts 28 which locate body 12 by means of slots 30 cut therein. Because of the external and internal seal arrangement, the device is self-aligning which helps prevent side loads on the needle and seals and yields the extended life experienced.

It is contemplated that various changes and modifications may be made to the dispense head without departing from the spirit and scope of the invention as defined by the following claims.

What is claimed is:

1. A modular hot melt dispense head for connection to a source of hot melt adhesive comprising:
   a housing having a cavity;
   a seal cartridge having first and second ends, a longitudinal bore and a circumference;
   a needle piston located in said bore and having a smaller diameter than said bore so that said needle piston diameter is not in contact with said bore to provide a loose, floating fit;
   first and second internal seals located in said bore at said first and second ends, said seals locating said needle piston in said bore;
   at least one backup ring closely adjacent at least one of said internal seals, said backup ring being relatively soft;
   a plurality of externals seal located on said circumference and sealing said cartridge in said cavity, the diameter of said cartridge circumference is less than the diameter of said cavity thereby allowing said external seals to locate said cartridge in said cavity and allow said cartridge to float in said cavity and maximize concentricity of said needle piston relative to said cavity; and
   means for positively locating said cartridge in said cavity, said locating means comprising a slot in said cartridge circumference and at least one shoulder bolt engaging said slot to axially locate said cartridge in said cavity yet allow said cartridge to radially float in said cavity.

2. The modular hot melt dispense head of claim 1, said ring having a durometer hardness of between approximately 60 and 75 Shore A.

3. The modular hot melt dispense head of claim 2, said ring having a durometer hardness of approximately 70 Shore D.

4. The modular hot melt dispense head of claim 1 wherein said internal seals are quad seals.

5. The modular hot melt dispense head of claim 4 wherein said quad seals are comprised of Viton.

* * * * *